INVENTOR
ANDREW F. FARR
BY
ATTORNEY

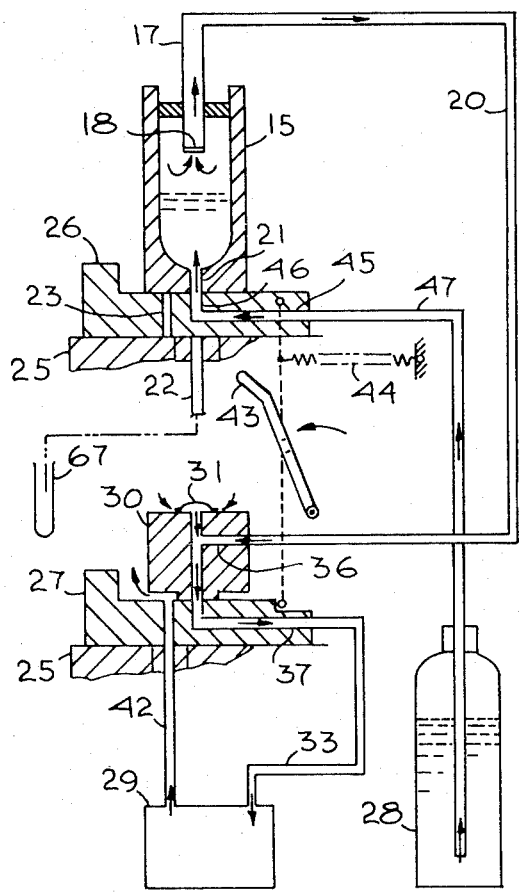
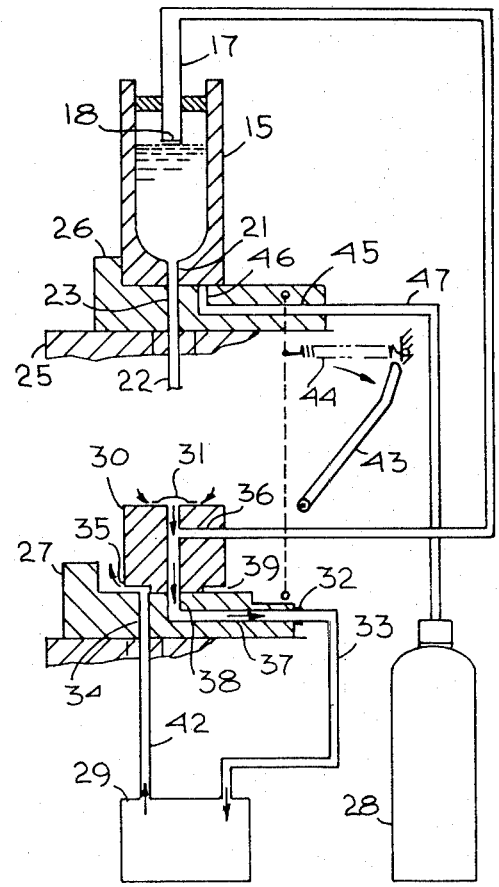
Fig. 4
Fig. 5
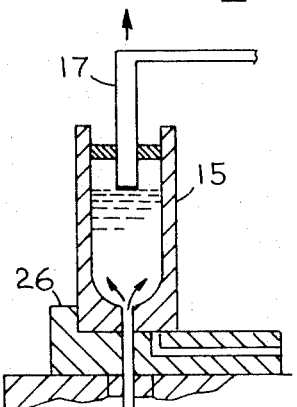
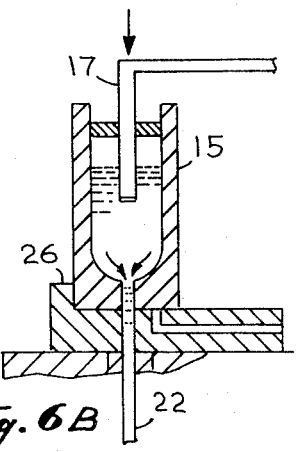
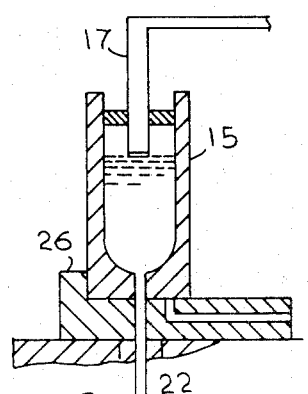
Fig. 6C   Fig. 6B   Fig. 6A Jan. 23, 1973   A. F. FARR   3,712,794
LABORATORY PIPETTE AND DILUTER DEVICE
Filed Jan. 26, 1971   5 Sheets-Sheet 4

INVENTOR
ANDREW F. FARR
BY
ATTORNEY

United States Patent Office 3,712,794
Patented Jan. 23, 1973

3,712,794
LABORATORY PIPETTE AND DILUTER DEVICE
Andrew F. Farr, Spring Valley, Calif., assignor to Farr Devices Inc., Spring Valley, Calif.
Continuation-in-part of application Ser. No. 769,825, Oct. 23, 1968. This application Jan. 26, 1971, Ser. No. 109,758
Int. Cl. B01l 3/02; G01f 11/28
U.S. Cl. 23—259
1 Claim

ABSTRACT OF THE DISCLOSURE

A laboratory apparatus for semi-automatically accurately measuring out a volume of diluting reagent and also accurately measuring out a volume of a liquid sample for analysis, and for discharging both liqids into a reaction vessel, with pre-set or adjustable volumes for both liquids. The operation is effected by means of a small motor driven air pump which provides air at increased or reduced pressures as required, and an air-permeable but hydrophobic porous membrane serves to fix the liquid level in the measuring pipette.

---

This is a continuation-in-part of my pending application Ser. No. 769,825, filed Oct. 23, 1968 now Pat. No. 3,567,398.

BACKGROUND OF THE INVENTION

In analytical laboratories, particularly in clinical laboratories where test portions of a large number of different liquid samples are measured out and then diluted with a predetermined volume of a reagent liquid as first steps in an analytical procedure, a semi-automatic pipetting and diluter device can facilitate the operations, and insure against error of manual measurement in the usual practice.

One object of this invention is to provide a semi-automatic pneumatic device for repeatedly measuring out a pre-selected volume of a reagent liquid, and discharging it into a reaction vessel. Another object is to provide a semi-automatic pneumatic device which repeatedly measures out from a reservoir a selected volume of a diluent or reagent liquid, then measures in a selected volume of the sample liquid which is to be analyzed, and subsequently discharges both measured liquids through a common outlet tube into a reaction vessel. A further object is to utilize a non-wettable membrane means for fixing the volume of reagent or diluting liquid delivered into the volumetric chamber of the device for sebusequent discharge with or without the measured sample liquid into a reaction receptacle, preparatory to further analytical procedures.

BRIEF DESCRIPTION OF THE DRAWINGS

FIG. 4 is a diagrammatic arrangement of parts showing the pneumatic dicruit during the pipette filling cycle;

FIG. 5 is similar to FIG. 4 at the end of the pipette filling cycle;

FIG. 6A is a diagrammatic showing of the filled pipette;

FIG. 6B is a diagrammatic showing of the filled pipette with the volume displacer means inserted into the measured reagent liquid in the pipette to displace a volume of the reagent into the capillary discharge tube;

FIG. 6C is a diagrammatic showing of the intake of a measured sample liquid into the pipette discharge tube, equal to the displaced volume following FIG. 6B;

DESCRIPTION OF THE PREFERRED EMBODIMENT

Figure 1:
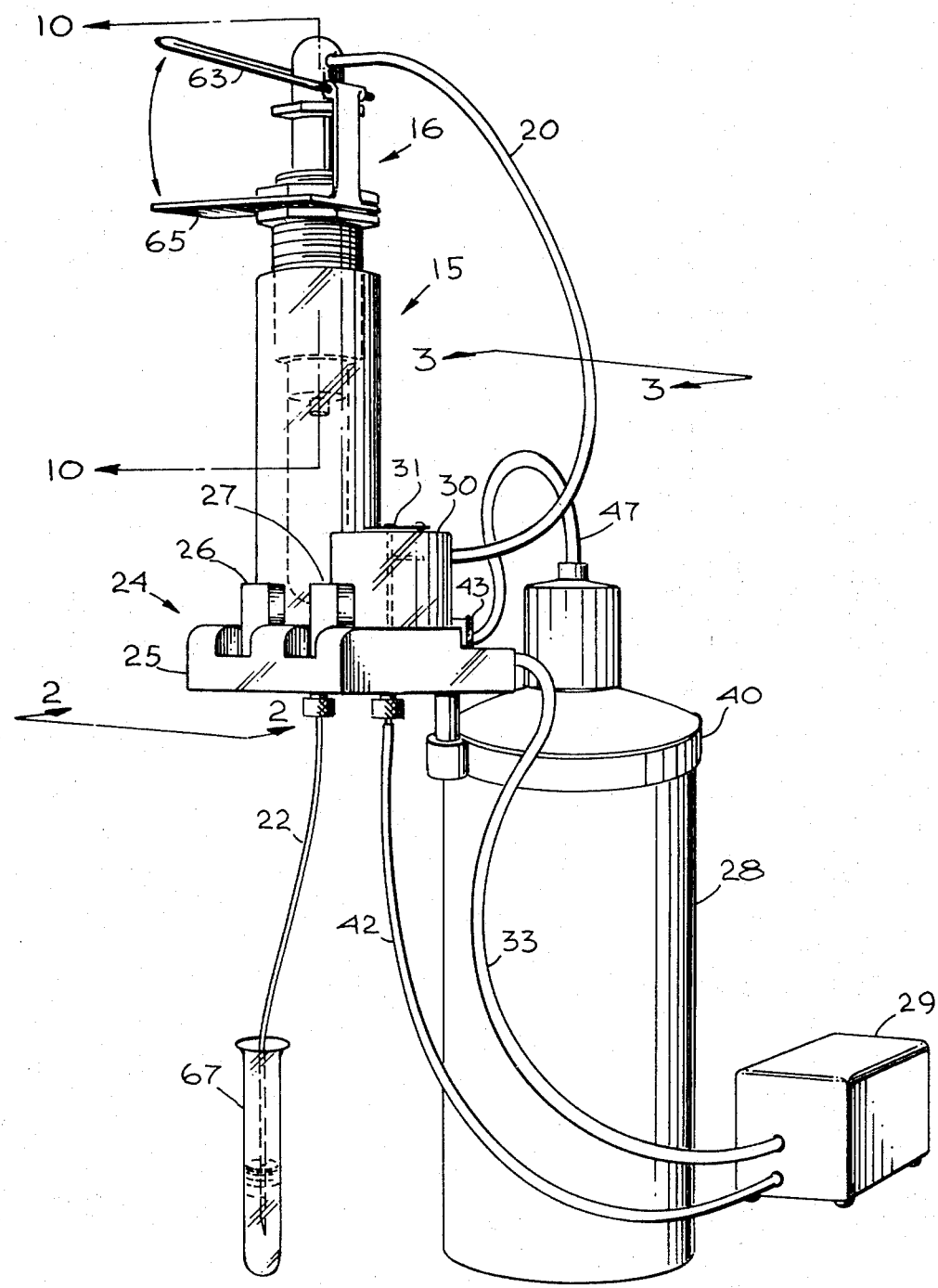
FIG. 1 is a perspective view showing the preferred arrangement of the pipette, source of air pressure, and valving mechanism.
Figure 2:
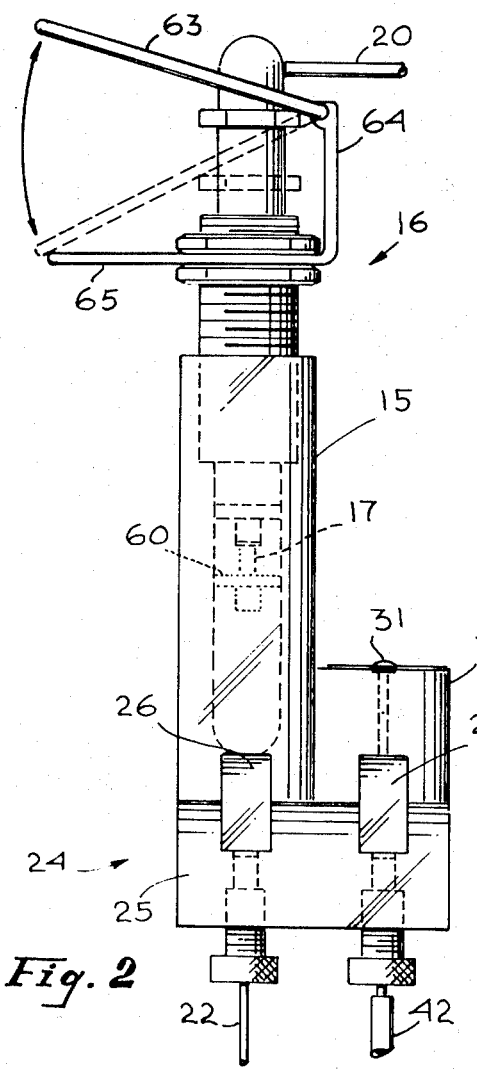
FIG. 2 is an elevational view taken from the position indicated as 2—2 on FIG. 1.
Figure 3:
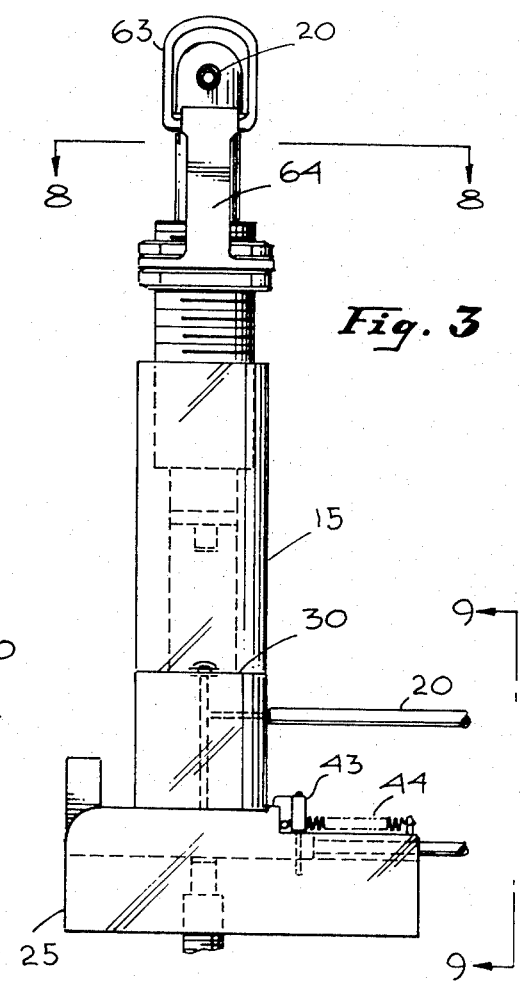
FIG. 3 is an elevational view taken from the position indicated as 3—3 on FIG. 1.
Figure 9:
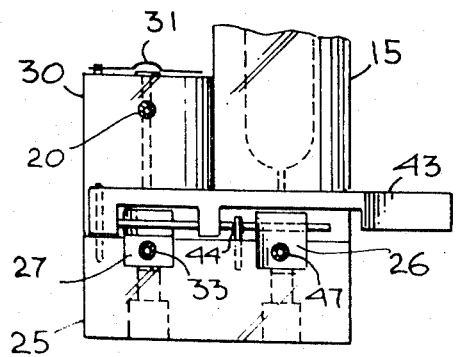
FIG. 9 is an enlarged partial elevational view taken from the position 9—9, as indicated on FIG. 3.
Figure 8:
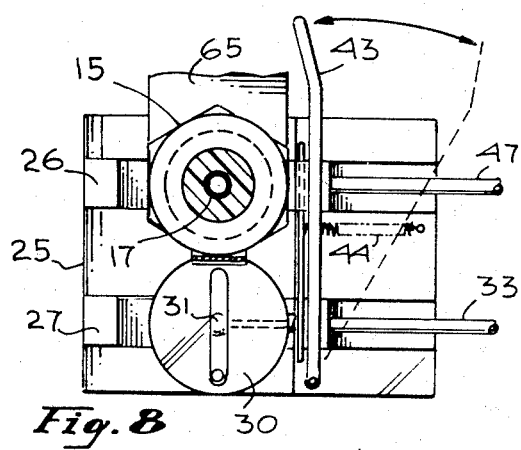
FIG. 8 is a plan view of the pipette and valve system from the position as indicated by 8—8 on FIG. 3.

The stated and other objectives are attained by my invention which will be understood from the following description of a preferred embodiment, reference being made to the accompanying drawings briefly described above.

As shown particularly in FIGS. 1 to 10, the semi-automatic pipetting and diluter device consists of a volumetric vessel herein called a pipette 15, a slide valve mechanism for both liquid and penumatic circuits including a base member 25 (serving as a support for the pipette as well as the valve means), an electrically driven air pump 29, a leak valve 30, and suitable connecting tubes and tubing, as will be further described, connecting the several parts.

The pipette 15 is provided with a vertically movable, and adjustable top closure 16, which includes a level-fixing tube 17 extending into the cavity of the pipette 15, the said tube being terminated inside the pipette cavity by a gas permeable hydrophobic membrane 18 the upper end 19 of said tube 17 being external and connected by flexible tubing 20 to a valve means. The valve means consists of a base member 25 having therein two closely fitting slide members, one 26 for controlling the liquid which enters the pipette from the reservoir 28, and the other slide member 27 which controls the air pressure and vacuum (reduced pressure) produced by an electrically driven air pump means 29. In the liquid circuit, a lower orifice 21 connects the pipette 15 at times to a duct 23 through the valve slide 26 to a capillary discharge tube 22. A longitudinal duct 45 in the slide 26 is connected by flexible tubing 47 to the outlet tube for the reagent reservoir 28, and the upturned inner end of said longiudinal duct 45 is arranged to communicate, at times, with the orifice 21 of the pipette.

In the pneumatic circuit, a leak valve 30 is provided, mounted on top of the base 25, with a manually operable closure plate 31 which may be used to augment the air pressure or suction when desired. The leak valve permits the continuous operation of the air pump means.

The air control slide member 27 is provided with a longitudinal duct 37 with an upwardly directed opening 38 making sliding contact to communicate either with the leak valve 30 or with an exhaust air opening 39, and at its outer end 32 is connected to the suction side of the pump 29 by a tube 33. The air control slide member 27 is also provided with a through duct 34 connected to the pressure side of the pump by the tubing 42 which alternatively, depending upon the positioning of the slide member, connects the air pressure either to an atmospheric exhaust port 35, or to the leak valve 30. The leak valve is provided with a side tube 36 and flexible connecting tubing 20 to the upper end of the level-fixing tube 17.

Either air pressure or suction may thus be applied as desired to the upper portion of the chamber of the pipette 15 through the level-fixing tube 17, depending upon the position of the air control slide member 27.

The two slide valves 26 and 27 are actuated by a lever 43 mounted on the base member 25, there being provided a tension spring 44. After the slide valves are moved forward simultaneously to effect the filling of the pipette, the spring 44 returns the slide 26 and lever 43, leaving the air slide valve 27 at a position to maintain a slightly reduced pressure on the liquid in the pipette, and connecting the orifice 21 at the bottom of the pipette through the valve 26 to the capillary discharge tube 22.

The valve means 24 and the pipette 15 are mounted on the base member 25, the said base member being mounted on the reservoir 28 by suitable clamp means 40, to form a convenient unitary article.

Figure 10:
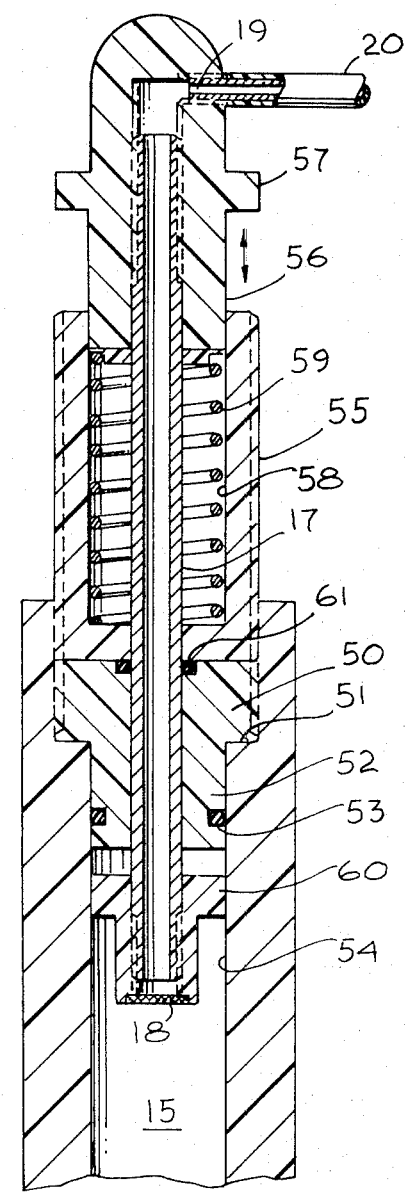
FIG. 10 is an enlarged side elevational view partly in section of the upper portion of the pipette as indicated at 10—10 on FIG. 1.

The adjustable closure means 16 for the pipette 15 is shown particularly in the enlarged side elevational view FIG. 10. The upper end of the pipette 15 is provided with a stopper 50 threadedly engaging an enlarged threaded cylindrical recess 51 therein, there being a smaller closely fitting cylindrical portion 52 provided with an O-ring seal 53 against the inside cylindrical walls 54 inside the pipette 15. A fixed extension sleeve member 55, threaded at its lower end and engaging the threads of the cylindrical recess 51 above the stopper 50 has a movable cylindrical plug 56 with a stop collar 57 at its upper end, this plug 56 being slidably movable within the cylindrical cavity 58 of said extension sleeve member 55, there being a coiled compression spring 59 in said cavity, acting to keep the plug 56 in upwardly extended position. The liquid level-fixing tube 17, extending into the cavity of the pipette 15, is threadedly attached near its upper end to the plug 56, and at its lower end to the piston 60 which is movable inside the cavity of the pipette 15, the tube 17 being free to move within the stopper 50 and the extension sleeve member 55. An O-ring seal 61 is provided in the stopper 50 around the tube 17. The distance that the plug 56 may be moved is fixed by its variable position on the threaded upper end of the tube 17, and this distance determines the amount of displacement of liquid in the cavity of the pipette as fixed by the hydrophobic membrane 18 across the end of the tube 17' within said cavity, into the capillary discharge tube 22, as more fully explained below.

A pivoted lever means 63 (see particularly FIGS. 2 and 3) pivoted on a fulcrum arm 64 is provided so that the selected displacement of the piston 60 may be effected, stop means 65 being provided to facilitate thumb and finger activation of said lever means.

(A) The operation of the pipetting and diluter device may be further described as follows, referring particularly to FIGS. 4 to 7. To fill the pipette, the slide valves 26 and 27 are positioned as shown in FIG. 4, the reagent liquid from the reservoir 28 being drawn into the cavity of the pipette 15 through the tubing 47 and the ducts 45 and 46 in the slide 26, through the orifice 21 of the pipette. Reduced pressure is provided at the top of the pipette by pumping out air through the tubing 20 connected to the vacuum side of the pump means 29, via the duct 37 in the slide 27 communicating through the leak valve 30 and its side tube 36, and the tubing 20 connected to the level-fixing tube 17 in the pipette, the air being drawn through the air-permeable but hydrophobic membrane 18 at the end thereof. When the level of the liquid in the pipette cavity reaches the membrane 18, the flow of air and liquid is closed off due to the hydrophobic property of the membrane, and a reduced pressure is maintained in the pneumatic circuit.

Figure 7:
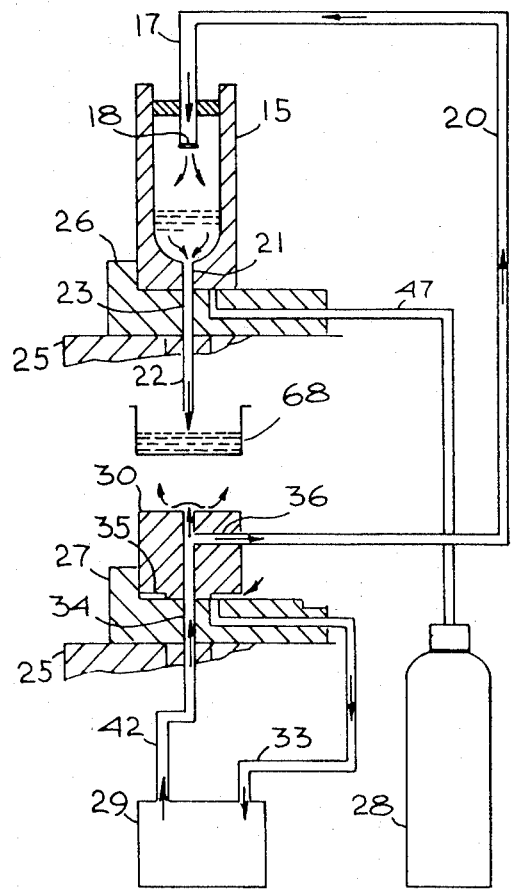
FIG. 7 is a diagrammatic showing of the pipette and its contents of measured diluting liquid and measured inspirated sample being discharged into a reaction vessel; together with the pneumatic circuit on the discharge cycle.

(B) In this condition, the pipette will, if desired, discharged the predetermined volume of reagent liquid through the capillary discharge tube 22 when (1) the slide valve 26 has been positioned to connect the orifice 21 through the through-duct 23 to the discharge tube 22, and when (2) the air circuit has been changed by moving the slide 27 to the position shown in FIG. 7, wherein the pressure side of the air pump means 29 is connected to the top of the pipette through the tubing 20, the side tube 36 of the leak valve 30, the through-duct 34 and tube 42 connected to the pump.

(C) If, however, it is desired to add the measured amount of reagent liquid already in the pipette, to a measured amount of an unknown sample liquid contained in a sample tube 67 (see FIG. 4), the liquid circuit as described above at the end of paragraph (A), and shown diagrammatically in FIG. 6A, is maintained. When the piston 60 is moved downward by the action of lever 63 (FIG. 2), liquid from the pipette is displaced into the empty capillary discharge tube 22, the lower tip of tube 22 is then immersed in the sample in sample tube 67. As piston 60 is returned upward, the liquid which was previously displaced from the pipette returns from capillary tube 22 and draws behind it an equivalent volume of the sample liquid from tube 67.

The measured diluting liquid in the pipette and the inspirated and measured amount of sample liquid may then be discharged into a reaction vessel 68 (FIG. 7), by moving the air circuit valve slide 27 to the position shown in FIG. 7, whereby air pressure is applied to the top of the liquid in the pipette, through the membrane 18, the tube 17, the tubing 20, through the leak valve 30 and the tubing 42 connected to the pressure side of the air pump means 29.

Figure 11:
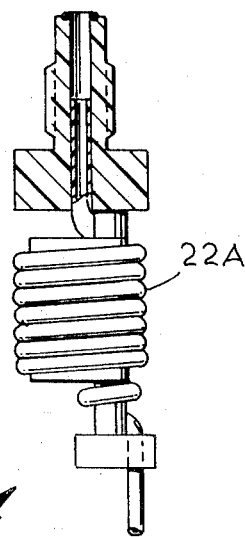
FIG. 11 is an alternative form of a pipette discharge tube having an increased capacity for the inspirated sample.

The capillary discharge tube 22 is not contaminated by the liquid sample because it is preferably made from hydrophobic plastic material, for example a fluorocarbon resin such as "Teflon" manufactured by the E. I. du Pont de Nemours & Co. Inc. The inside of the tube 22 is swept clean by the discharge therethrough of the diluting liquid contained in the pipette.

Where it is desired to provide for a larger portion of the liquid sample, the discharge capillary tube may be lengthened to provide the greater volume. A coiled capillary discharge tube 22A is provided as shown in FIG. 11. Dilution ratios of 1:250 to 2:3 in a total volume of 5 milliliters have been attained, with a precision of approximately ±0.5 to 1.0 percent on repeated operations. Pre-set volumes of diluter liquid and sample liquid may be readily attained.

The gas-permeable hydrophobic membrane may be made from a number of gas-pervious compositions having the property of not being surface-wetted by an aqueous liquid, including "Millipore" disks, porous "Teflon" disks, controlled-porosity polyethylene disks, or any air-pervious disks or plugs which have been coated with a hydrophobic composition over all or a portion of the pore surfaces.

Figure 12:
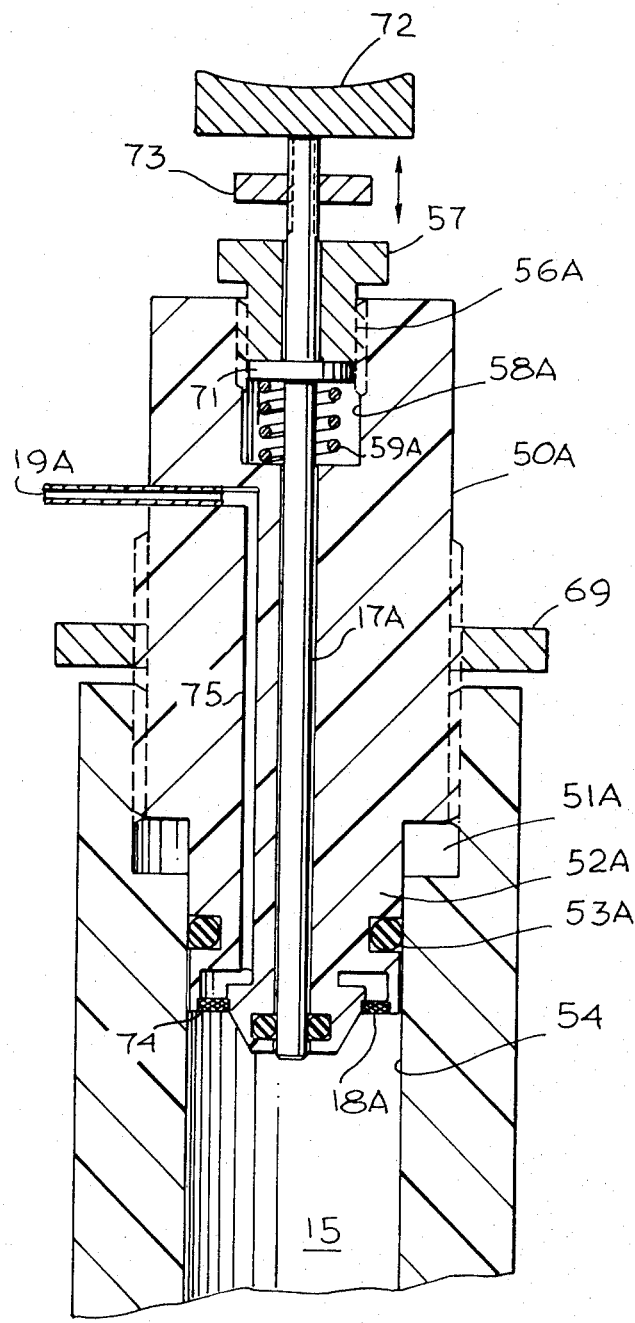
FIG. 12 is an enlarged side elevational view partly in section of an alternative means for displacing the measured liquid in the pipette, corresponding to the sample liquid to be inspirated into the discharge tube.

An alternative arrangement for the upper part of the pipette (as shown in FIG. 10), is shown in FIG. 12, in which a displacement rod independent of the level-fixing hydrophobic membrane is provided. The volumetric chamber of the pipette is indicated at 15. A stopper 50A threadedly engages an enlarged threaded cylindrical recess 51A therein, there being a smaller closely fitting cylindrical portion 52A on the lower end provided with an O-ring seal 53A against the inside cylindrical walls 54 inside the pipette 15. A lock nut 69 is provided, operable in the threads of the enlarged portion of the stopper 50A above the pipette. A solid rod 17A extends axially through the stopper 50A, entering the chamber of the pipette 15 after passing through an O-ring seal 53A at the lower end 52A of the stopper 50A. The upper end portion of the rod 17A passes through an axial cavity 58A in the upper portion of the stopper 50A, there being a fixed collar 71 on the rod which engages a coiled compression spring 49A between said collar and the bottom of said cavity. A threaded plug 56A engaging threads in the cavity walls permits the adjustment of pressure exerted by the spring. The upper end of the rod 17A is terminated by a finger button 72 for downward actuation of the rod. An adjustment nut 73 between the plug 56A and the finger bottom 72, on the threaded upper end of the rod 17A acts as an adjustable stop means which fixes the amount of vertical movement of the rod, and hence the amount of displacement of liquid from the pipette.

A non-wettable membrane 18A is provided in an annular recess 74 in the bottom surface of the stopper 50A, this recess being in communication with the air pump through a side tube 19A in the stopper 50A above the lock nut 69, connected thereto through a duct 75 inside the plug. This modification of the device operates in an analogous manner to the preferred form described above. This alternative form has a larger operative area in the non-wettable membrane and for some special applications, has certain advantages.

It has been found that the operation of filling the pipette 15 is improved by applying pressure to the entering liquid, for example by maintaining pressure in the reservoir 28 somewhat above atmospheric pressure. This shortens the time for filling the reservoir, even with a lesser vacuum being applied above the membrane 18. The reduced vacuum above the membrane facilitates the sharp cut-off of liquid when it reaches the membrane and contributes to the reproducibility of the volume measured by the pipette.

I claim:
1. A pipette and diluter device comprising
   a pipette;
   means for flowing a volume of an aqueous liquid into the bottom portion of said pipette, including an inlet tube connected to a supply reservoir under pressure;
   an automatic level-fixing membrane disposed within said pipette fixing the top level of the liquid in the pipette to correspond to a selected volume of said liquid;
   means for applying suction above said membrane to hold the measured liquid in said pipette; and
   an outlet means alterantively connectable by valve means to said pipette and to said inlet tube.

References Cited
UNITED STATES PATENTS

| | | | |
|---|---|---|---|
| 2,423,173 | 7/1947 | Brady et al. | 23—292 X |
| 3,285,296 | 11/1966 | Ishimaru et al. | 73—425.6 |
| 3,567,398 | 3/1971 | Farr | 23—259 |

MORRIS O. WOLK, Primary Examiner

R. M. REESE, Assistant Examiner

U.S. Cl. X.R.

23—253 R; 222—440